United States Patent
Zhang et al.

(10) Patent No.: US 8,240,888 B2
(45) Date of Patent: Aug. 14, 2012

(54) LED UNIT

(75) Inventors: Hai-Wei Zhang, Shenzhen (CN);
Yi-San Liu, Shenzhen (CN);
Chin-Chung Chen, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 381 days.

(21) Appl. No.: 12/624,419

(22) Filed: Nov. 24, 2009

(65) Prior Publication Data

US 2011/0026262 A1    Feb. 3, 2011

(30) Foreign Application Priority Data

Jul. 29, 2009    (CN) .......................... 2009 1 0304963

(51) Int. Cl.
*F21V 5/00*    (2006.01)

(52) U.S. Cl. .............. 362/311.06; 362/311.02; 362/336; 362/340

(58) Field of Classification Search ................... 362/340, 362/335, 336, 326, 311.01, 311.02, 311.06–311.1
See application file for complete search history.

(56) References Cited

U.S. PATENT DOCUMENTS

| | | | |
|---|---|---|---|
| 5,722,758 A * | 3/1998 | Huang | ......................... 362/548 |
| 6,590,235 B2 * | 7/2003 | Carey et al. | ..................... 257/98 |
| 6,903,380 B2 * | 6/2005 | Barnett et al. | ................. 257/98 |
| 2007/0230182 A1 * | 10/2007 | Tai et al. | ....................... 362/294 |

* cited by examiner

*Primary Examiner* — Julie Shallenberger
(74) *Attorney, Agent, or Firm* — Altis Law Group, Inc.

(57) ABSTRACT

An LED unit includes an LED and a lens receiving the LED. The LED includes a chassis, a base on the chassis and an envelope fixed on the base. The lens has two crossed grooves, a hole and a chamber sequentially defined in a bottom face the lens, along an upward direction thereof. The chassis of the LED can be selected to fit in one of the two grooves. The base of the LED is engaged in the hole of the lens, and the envelope of the LED is received in the chamber of the lens.

10 Claims, 5 Drawing Sheets

LED UNIT

BACKGROUND

1. Technical Field

The present disclosure relates to a light emitting diode (LED) unit and, more particularly, to an LED unit having a lens which can be accurately mounted on an LED thereof.

2. Description of Related Art

LEDs, available since the early 1960's and because of their high light-emitting efficiency, have been increasingly used in a variety of occasions, such as residential, traffic, commercial, and industrial occasions. Conventionally, light directly output from the LED does not have a desirable pattern; therefore, light-adjusting elements, such as lens, are used with the LED to modulate the light pattern thereof.

In order to produce a target light pattern, the lens should be accurately positioned with respect to the LED, since any error in assembling the lens to the LED may result in deformation or even distortion of the output light pattern. However, subject to limitations of LED size, assembling technology and other reasons, there is still lack of effective means of accurately positioning the lens relative to the LED now.

What is needed, therefore, is an LED unit which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
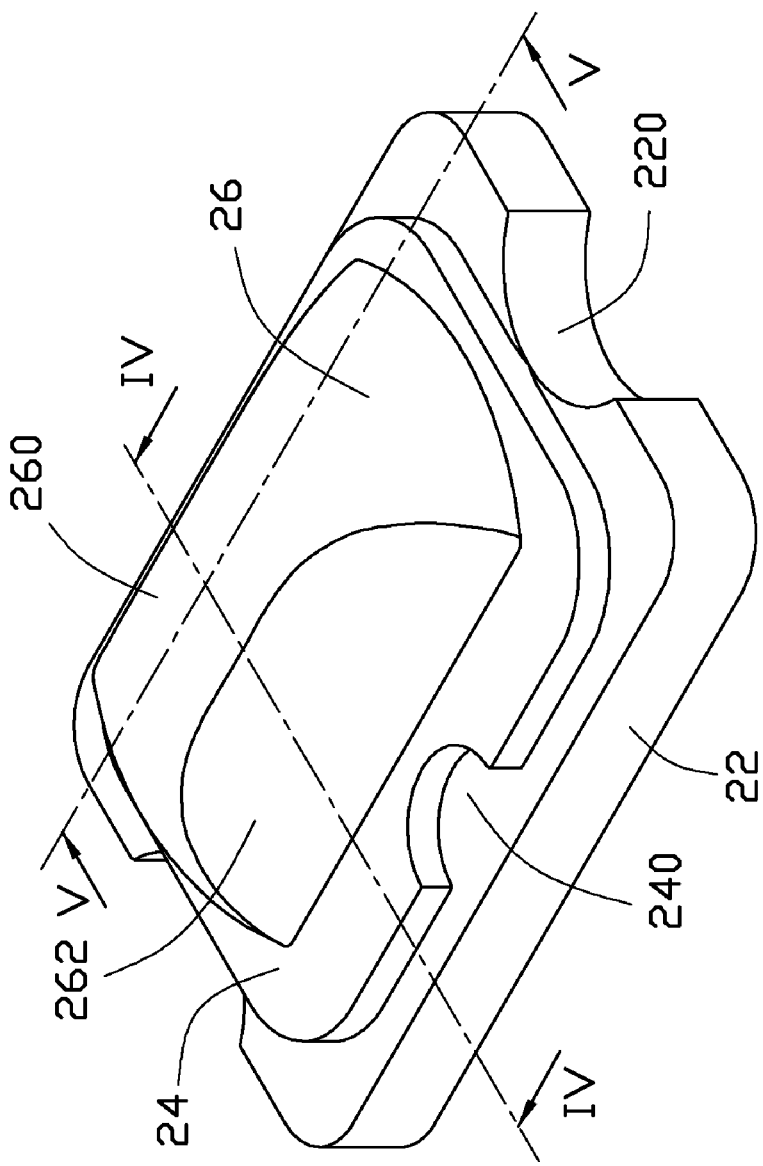
FIG. 1 is an isometric, assembled view of an LED unit of the disclosure.
Figure 2:
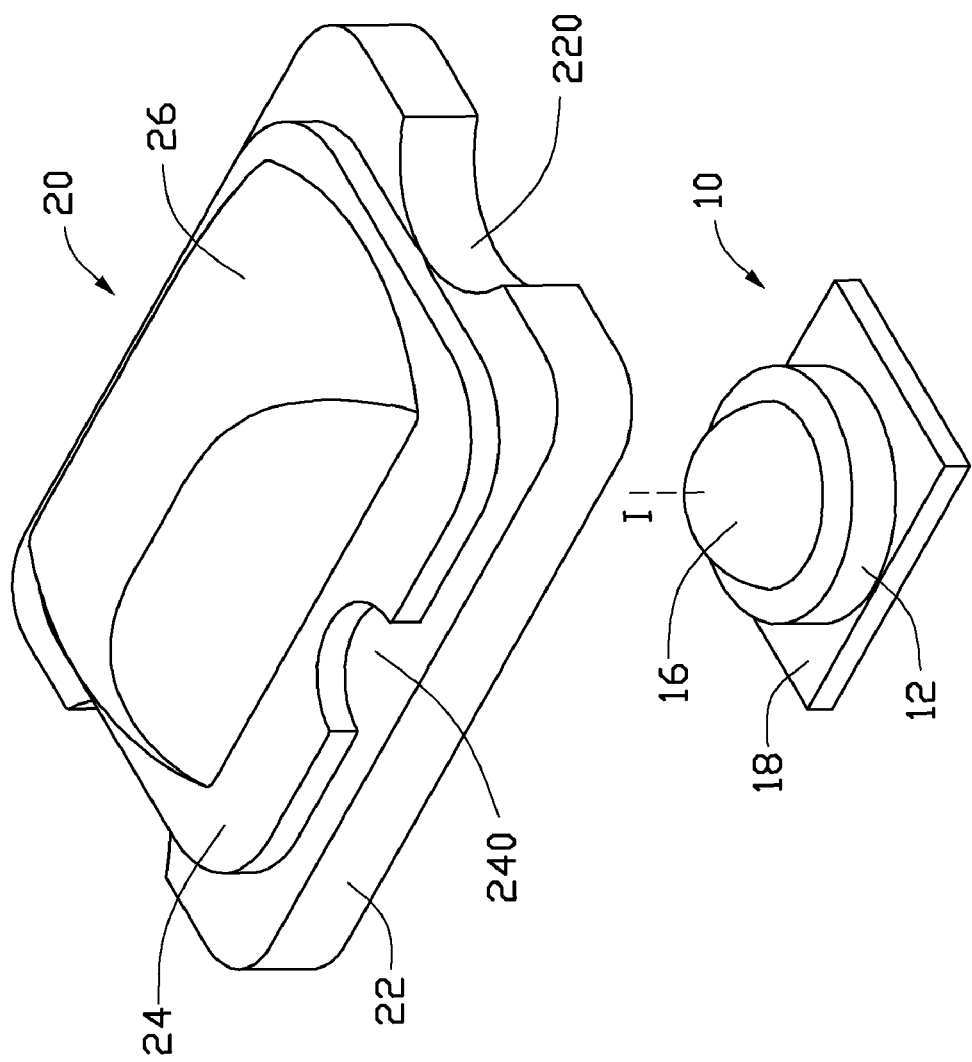
FIG. 2 is an exploded view of the LED unit of FIG. 1.
Figure 4:
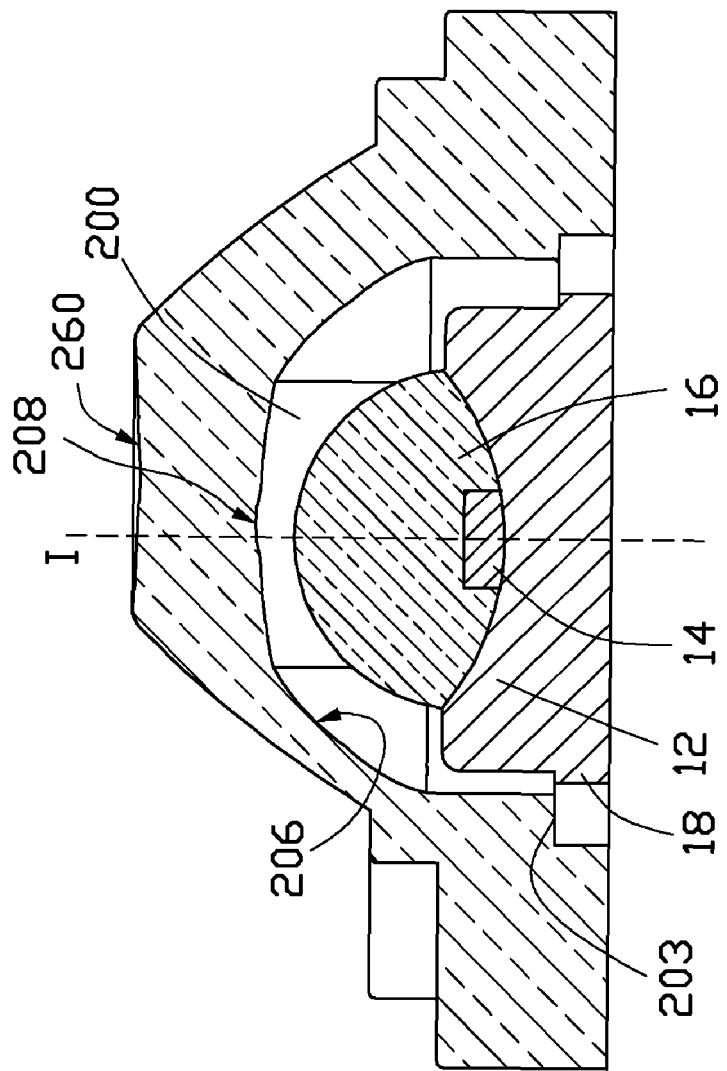
FIG. 4 is a cross-section of FIG. 1 taken along line IV-IV thereof.

Referring to FIGS. 1-2 and 4, an LED unit of the present disclosure is illustrated. The LED unit comprises an LED 10 and a lens 20 mounted on the LED 10. The LED 10 comprises a rectangular chassis 18, a circular base 12 mounted on a central area of a top face of the chassis 18, an LED die 14 attached on a top face of the base 12 (see FIG. 4), and an envelope 16 fixed on the top face of the base 12 and covering the LED die 14. The chassis 18 is made of a heat-conductive material, such as aluminum, copper or other suitable materials. The base 12 may be made integrally with or separately from the chassis 18. In the shown embodiment, the base 12 is formed integrally with the chassis 18. The base 12 has an area smaller than that of the chassis 18. A concave is defined in the top face of the base 12 to receive the LED die 14 therein. The LED die 14 is attached to the base 12 via a heat-conductive adhesive, such as epoxy resin doped with silver particulates. The envelope 16 substantially fills the concave in the base 12 and protrudes upwardly as a dome. The envelope 16 is made from a transparent material to allow light emitted from the LED die 14 to radiate out of the LED 10.

Figure 3:
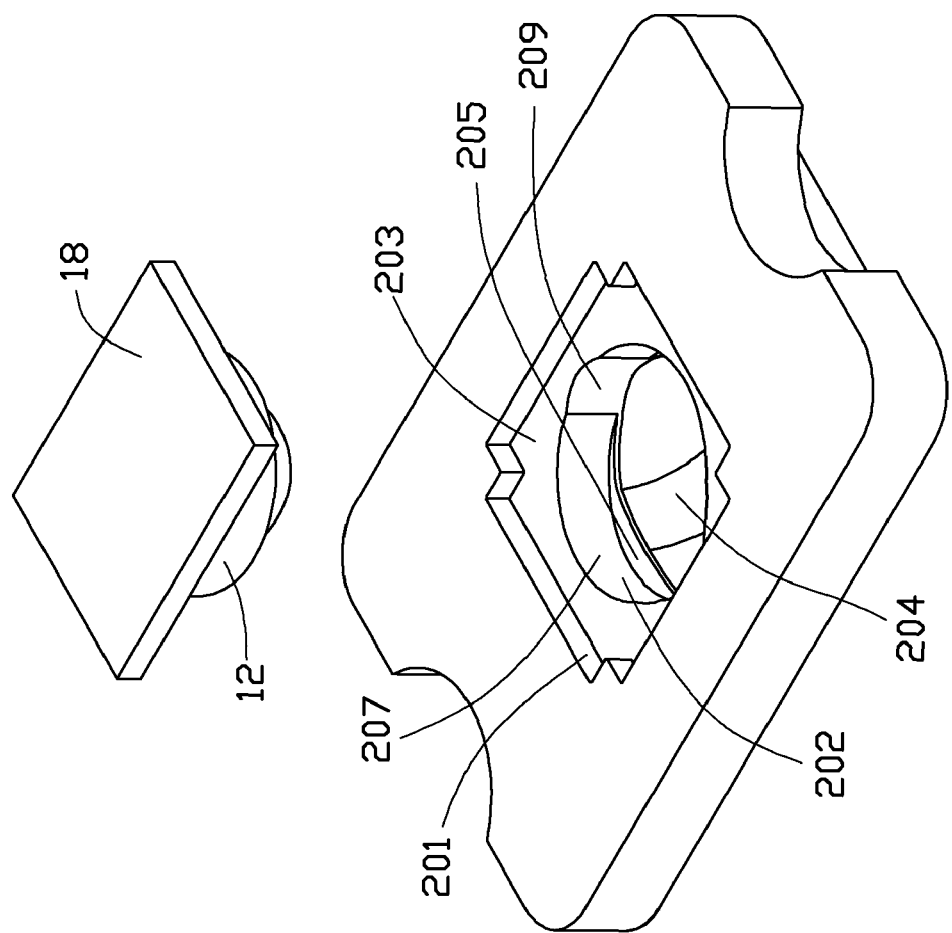
FIG. 3 is an inverted view of FIG. 2.

Also referring to FIG. 3, the lens 20 is integrally made of a transparent material similar to that for forming the envelope 16 of the LED 10, such as PC (polycarbonate) or PMMA (polymethyl methacrylate). The lens 20 includes a rectangular substrate 22, an arced protrusion 26 and a rectangular plate 24 interconnecting the substrate 22 and the protrusion 26. The substrate 22 has a pair of curved cutouts 220 defined at a front side and a rear side thereof. Two crossed grooves 201 are defined in a bottom face of the substrate 22. Each groove 201 has an area similar to that of the chassis 18 of the LED 10, so that the chassis 18 of the LED 10 can be received in only one of the grooves 201 at one time, due to the size limitation thereof. By such crossed design of the two grooves 201, the chassis 18 of the LED 10 could selectively fit into one of the two grooves 201 to position the lens 20 at different directions, i.e., a front-rear direction and a left-right direction, whereby the lens 20 could produce different light patterns corresponding to the different directions. Inner circumferential faces of the substrate 22 defining the two grooves 201 are for limiting the chassis 18 of the LED 10 from moving at both of the front-rear direction and left-right direction.

Figure 5:
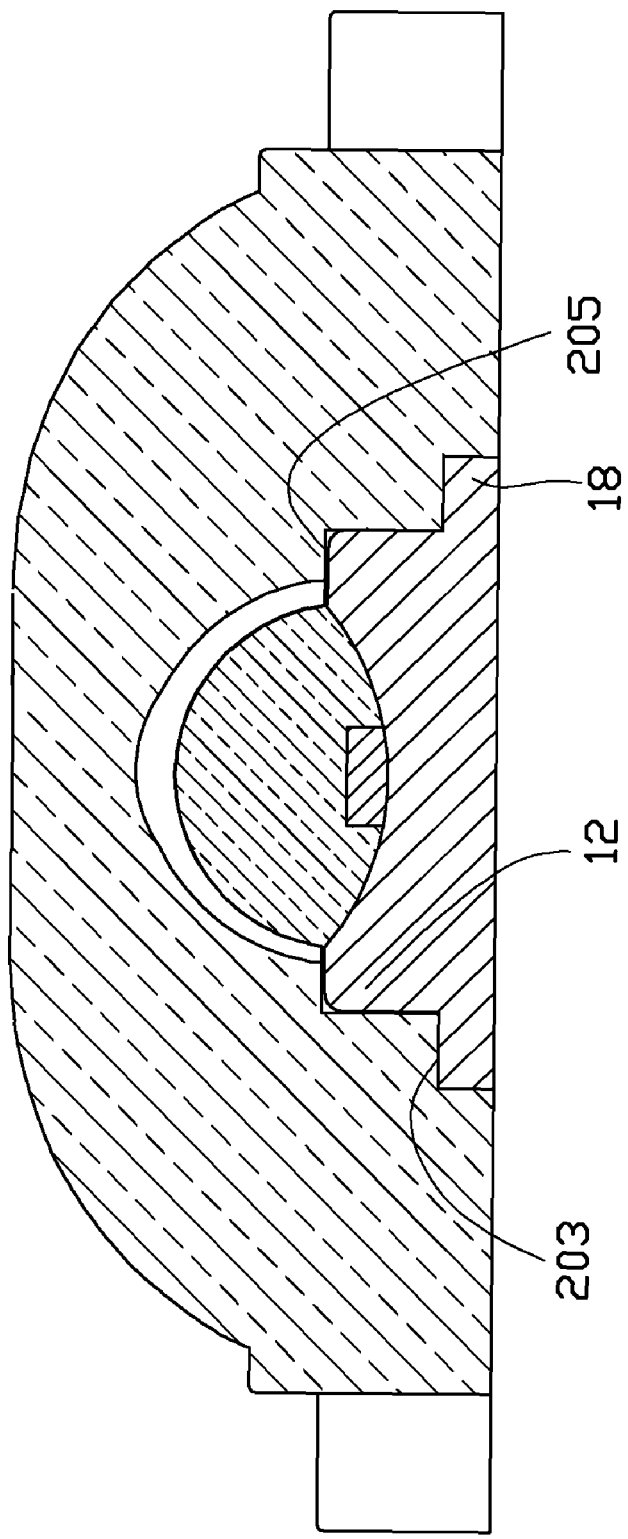
FIG. 5 is a cross-section of FIG. 1 taken along line V-V thereof.

Also referring to FIG. 5, a hole 202 is further formed in an inner bottom face of the substrate 22 defining the grooves 201. The hole 202 is deeper than the grooves 201 for receiving the base 12 of the LED 10. The hole 202 is confined by two opposite first surfaces 207 and two opposite second surfaces 209, wherein the two opposite first surfaces 207 are located at a front and a rear sides of the hole 202, and the two opposite second surfaces 209 are located at a left and a right sides of the hole 202. Each first surface 207 is a part of a circle while each second surface 209 is a part of an ellipse. Each first surface 207 has an area larger than that of the second surface 209, and a curvature less than that of the second surface 209. When the base 12 of the LED 10 is received in the hole 202, the two first surfaces 207 would abut against a circumferential surface of the base 12 (see FIG. 5), and the two second surfaces 209 would be spaced from the circumferential surface of the base 12 with gaps (see FIG. 4), thereby preventing the base 12 of the LED 10 from movement along the front-rear direction; remaining area 203 of the inner bottom face of the substrate 22 defining the grooves 201 which is beside the hole 202 would abut against a top face of the chassis 18 of the LED 10 to prevent the chassis 18 of the LED 10 from an upward movement.

A chamber 204 is further formed in the lens 20 to receive the envelope 16 of the LED 10. The chamber 204 is confined by a first arced surface 206 and a spherical surface 208 formed in a middle of the first arced surface 206. The first arced surface 206 is spaced from the two first surfaces 207 via two narrow faces 205 facing vertically downwards, and directly connected to the two second surfaces 209. The two narrow faces 205 are for abutting against a top face of the base 12 of the LED 10, thus further limiting the LED 10 from the upward movement.

The plate 24 is located at a central area of a top face of the substrate 22. The plate 24 is thinner and smaller than the substrate 22. A cutout 240 is formed at a left side of the plate 24 to indicate an optical polarity (i.e., deflecting direction) of the lens 20, wherein less light from the LED 10 will be directed to the left side of the lens 20 and emit outwards therefrom and more light will be directed to the right side of the lens 20 and emit outwards therefrom. The protrusion 26 is located near a right side of a top face of the plate 24, away from the left side of the plate 24 in which the cutout 240 is defined. The protrusion 26 has two half ellipses 262 and a second arced surface 260 interconnecting the two half ellipses 262. The second arced surface 260 has a width decreasing from a rear side to a center of the protrusion 26, and increasing from the center to a front side of the protrusion 26. Each half ellipse 262 has a width increasing from the rear side to a center of the protrusion 26, and decreasing from the center to the front side of the protrusion 26.

Since both of vertical surfaces (including the first and second surfaces 207, 209 defining the hole 202 and the inner circumferential surfaces defining the grooves 201) and horizontal surfaces (including the inner bottom surface defining the two grooves 201 and the narrow surface 205 defining the hole 202) of the lens 20 can abut against different parts of the LED 10 in both horizontal direction (the left-right direction or the front-rear direction) and vertical direction (the upward direction), the lens 20 could be accurately positioned on the LED 10.

It is believed that the present disclosure and its advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. An LED (light emitting diode) unit, comprising:
an LED; and
a lens mounted on the LED;
wherein the LED has a vertical surface abutting against the lens to prevent the lens from a horizontal movement, and a horizontal surface abutting against the lens to prevent the lens from a vertical movement; and
wherein the lens has two intersecting grooves defined in a bottom face thereof, a chassis of the LED being fitted in one of the two intersecting grooves;
wherein the lens has a hole located above and communicating with the two grooves, and the LED has a circular base above the chassis thereof and received in the hole of the lens;
wherein the hole is confined by two opposite first surfaces and two opposite second surfaces, and the two second surfaces each have a curvature which is different from that of each of the two first surfaces;
wherein the lens has a chamber communicating with and located above the hole, the chamber being confined by a third surface; and
wherein the two first surfaces are separated from the third surface via two narrow surfaces, and the two second surfaces are directly connected to the third surface.

2. The LED unit as claimed in claim 1, wherein the chassis is rectangular.

3. The LED unit as claimed in claim 2, wherein each of the grooves has an area similar to that of the chassis of the LED.

4. The LED unit as claimed in claim 1, wherein the hole has an area less than a total area of the two grooves.

5. The LED unit as claimed in claim 1, wherein each of the first surfaces is a part of a circle and each of the second surfaces is a part of an ellipse, the curvature of each of the first surfaces being smaller than that of each of the second surfaces.

6. The LED unit as claimed in claim 1, wherein the first surfaces abut against a circumferential surface of the base of the LED, and the second surfaces are spaced from the circumferential surface of the base of the LED.

7. The LED unit as claimed in claim 1, wherein the third surface comprises an arced surface and a spherical surface located at a middle of the arced surface.

8. The LED unit as claimed in claim 1, wherein the two narrow surfaces abut against a top surface of the base of the LED.

9. An LED (light emitting diode) unit comprising:
an LED comprising a base; and
a lens receiving the LED;
wherein the base of the LED has a top face in contact with an inner horizontal surface of the lens, and a circumferential face abutting against an inner vertical surface of the lens;
wherein the lens has two crossed grooves defined in a bottom face thereof, the LED comprising a chassis selectively received in one of the two grooves of the lens, the bottom face of the lens over the crossed grooves defining the inner horizontal surface of the lens, the bottom face of the lens above the crossed grooves defining the inner vertical surface of the lens; and
wherein the inner vertical surface of the lens extends downwardly from edges of the inner horizontal surface of the lens.

10. The LED unit as claimed in claim 9, wherein the inner vertical surface of the lens has a part spaced from the circumferential face of the base of the LED.

* * * * *